US009469694B2

(12) United States Patent
Song et al.

(10) Patent No.: US 9,469,694 B2
(45) Date of Patent: Oct. 18, 2016

(54) PREPARATION METHOD OF ACETYLATED CELLULOSE ETHER, AND ACETYLATED CELLULOSE ETHER PREPARED THEREBY

(71) Applicant: SAMSUNG FINE CHEMICALS CO., LTD., Ulsan (KR)

(72) Inventors: Min Ju Song, Ulsan (KR); Byoung Hee Son, Ulsan (KR)

(73) Assignee: LOTTE FINE CHEMICAL CO., LTD. (KR)

( * ) Notice: Subject to any disclaimer, the term of this patent is extended or adjusted under 35 U.S.C. 154(b) by 29 days.

(21) Appl. No.: 14/363,991

(22) PCT Filed: Nov. 16, 2012

(86) PCT No.: PCT/KR2012/009735
§ 371 (c)(1),
(2) Date: Jun. 9, 2014

(87) PCT Pub. No.: WO2013/100357
PCT Pub. Date: Jul. 4, 2013

(65) Prior Publication Data
US 2014/0343272 A1  Nov. 20, 2014

(30) Foreign Application Priority Data

Dec. 30, 2011  (KR) .................. 10-2011-0147429

(51) Int. Cl.
| C08B 13/00 | (2006.01) |
| C08B 11/08 | (2006.01) |
| C08B 3/06 | (2006.01) |
| C08B 11/02 | (2006.01) |
| C08B 11/20 | (2006.01) |
| C08L 1/32 | (2006.01) |

(52) U.S. Cl.
CPC ............. *C08B 13/00* (2013.01); *C08B 3/06* (2013.01); *C08B 11/02* (2013.01); *C08B 11/08* (2013.01); *C08B 11/20* (2013.01); *C08L 1/32* (2013.01)

(58) Field of Classification Search
CPC ...................................................... C08B 13/00
USPC ................................ 536/127, 124, 66, 91, 95
See application file for complete search history.

(56) References Cited

U.S. PATENT DOCUMENTS 2,977,351 A * 3/1961 Wiley ..................... C08J 3/16
159/4.09
6,624,299 B2 * 9/2003 Yamakawa et al. ........... 536/69

FOREIGN PATENT DOCUMENTS

| JP | 60-212401 | 10/1985 |
| JP | 02-129201 | 5/1990 |
| JP | 08-337601 | 12/1996 |
| JP | 2005-283997 | 10/2005 |
| KR | 1020110089662 | 8/2011 |

OTHER PUBLICATIONS

Matsumura (JP 2005-283997 A, Oct. 13, 2005, English Language Translation).*
Written Opinion—PCT/KR2012/009735 dated Mar. 26, 2013.
International Search Report—PCT/KR2012 dated Mar. 26, 2013.

* cited by examiner

*Primary Examiner* — Patrick Lewis
*Assistant Examiner* — Everett White
(74) *Attorney, Agent, or Firm* — Cantor Colburn LLP

(57) ABSTRACT

Disclosed are a method of preparing acetylated cellulose ether, and acetylated cellulose ether prepared thereby. Here, the disclosed method of preparing the acetylated cellulose ether includes dissolving acetylated cellulose ether in an organic solvent to obtain a mixture comprising a solution of the acetylated cellulose ether; removing an insoluble component that is insoluble in the organic solvent from the mixture; and adding the mixture to water to precipitate the acetylated cellulose ether. The acetylated cellulose ether prepared thereby has a turbidity of less than 40 formazin turbidity units (FTU).

7 Claims, No Drawings

PREPARATION METHOD OF ACETYLATED CELLULOSE ETHER, AND ACETYLATED CELLULOSE ETHER PREPARED THEREBY

TECHNICAL FIELD

The present invention relates to a method of preparing acetylated cellulose ether, and acetylated cellulose ether prepared by the method, and more particularly, to a method of preparing acetylated cellulose ether having improved turbidity, and acetylated cellulose ether prepared by the method.

BACKGROUND ART

Cellulose has three hydroxyl groups (—OH) per anhydroglucose unit. As these hydroxyl groups form regular hydrogen bonds within a molecule, a rigid crystalline structure is formed. Accordingly, cellulose has a stable structure that is not soluble in water or organic solvents.

When some of these hydrogen bonds in cellulose are substituted with an alkyl group, the substituted cellulose has a less rigid crystalline structure compared to unsubstituted cellulose, and thus, the substituted cellulose is converted into a cellulose ether that is a water-soluble polymer.

In order to improve the solubility of the cellulose ether that is a water-soluble polymer into an organic solvent, and to make use of the cellulose ether as thickeners, binders, or materials for membranes such as membranes for water-treatment, Korea Patent Publication No. 2011-0089662 discloses acetylated cellulose ether prepared by introducing an acetyl group into the cellulose ether. However, the acetylated cellulose ether prepared in the above manner has a low turbidity so that the commercial use thereof is limited.

DETAILED DESCRIPTION OF THE INVENTION

Technical Problem

An embodiment of the present invention provides a method of preparing acetylated cellulose ether.

Another embodiment of the present invention provides acetylated cellulose ether prepared by using the method, wherein the acetylated cellulose ether has improved turbidity.

Technical Solution

According to an aspect of the present invention, there is provided a method of preparing acetylated cellulose ether having a turbidity of less than 40 formazin turbidity units (FTU). The method includes: dissolving acetylated cellulose ether in an organic solvent to obtain a mixture comprising a solution of the acetylated cellulose ether; removing an insoluble component that is insoluble in the organic solvent from the mixture; and adding the mixture to water to precipitate the acetylated cellulose ether.

The organic solvent may include at least one compound selected from the group consisting of methanol, acetic acid, acetone, dimethylformamide, dimethyl sulfoxide, and 1-methoxy-2-propanol.

The removing of the insoluble component from the mixture may be carried out by at least one method of filtration and centrifugation.

The method of preparing the acetylated cellulose ether may further include washing and drying of the precipitated acetylated cellulose ether.

The acetylated cellulose ether may have a degree of substitution (DS) of an alkyl group of 1 to 2, a degree of molar substitution (MS) of a hydroxyalkyl group of 0 to 1, and a degree of substitution (DS) of an acetyl group of 1 to 2.

The acetylated cellulose ether may be formed by acetylating at least one cellulose ether selected from the group consisting of methylcellulose, hydroxypropylmethylcellulose, and hydroxyethylmethylcellulose.

According to another aspect of the present invention, there is provided acetylated cellulose ether having a turbidity of less than 40 formazin turbidity units (FTU).

Advantageous Effects

A method of preparing acetylated cellulose ether according to an embodiment of the present invention may result in acetylated cellulose ether obtained to be used as materials for high-strength transparent films, metal paste binders that should have less impurities, water-treatment membranes, and separation membranes prepared using an organic solvent. In addition, the acetylated cellulose ether prepared by using the method has a melting point, and accordingly may be applied to home appliances requiring transparency, and cases of home appliances requiring transparency.

Best Mode

Hereinafter, a method of preparing acetylated cellulose ether and acetylated cellulose ether prepared using the method, according to embodiments of the present invention, will be described in more detail.

First, a method of preparing acetylated cellulose ether according to an embodiment of the present invention will be described in more detail.

In a first step, cellulose ether is prepared by etherifying a hydroxyl group of cellulose. That is, by the etherification of the cellulose, some of the hydroxyl groups within the cellulose structure are blocked or a hydrogen atom of the hydroxyl group is substituted with other substituent (for example, $R_1$ to $R_5$, which will be described later) so as to prepare cellulose ether. Here, although the cellulose backbone is maintained without being cut, hydrogen bonds therein are destructed, and accordingly the cellulose is changed to have an amorphous structure, thereby obtaining water-soluble cellulose ether with a high molecular weight.

The water-soluble cellulose ether prepared in the first step may include at least one compound selected from the group consisting of methylcellulose, hydroxypropylmethylcellulose, and hydroxyethylmethylcellulose.

In addition, the water-soluble cellulose ether prepared in the first step may have a degree of substitution (DS) of an alkyl group of 1 to 2, and a degree of molar substitution (MS) of a hydroxyalkyl group of 0 to 1. Here, the alkyl group may have 1 to 16 carbon atoms.

In a second step, a hydrogen atom of a hydroxyl group contained in the prepared water-soluble cellulose ether is substituted with an acetyl group ($CH_3CO^-$) (acetylation) to prepare acetylated cellulose ether that is insoluble in water. Formulae 1 and 2 below show processes of converting anhydroglucose, as a basic repeating unit of cellulose, into a basic repeating unit of acetylated cellulose ether by etherification and acetylation of the anhydroglucose in the stated order.

[Formula 1]

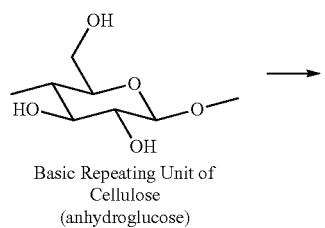

Basic Repeating Unit of
Cellulose
(anhydroglucose)

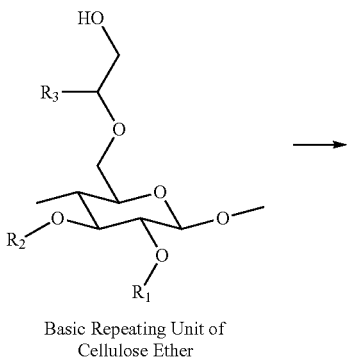

Basic Repeating Unit of
Cellulose Ether

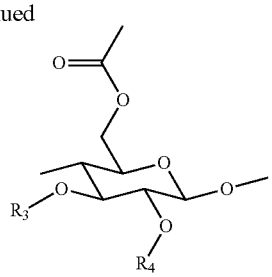

Basic Repeating Unit of
Acetylated Cellulose Ether

Formula 1 above shows that the cellulose is converted into hydroxyalkylalkylcellulose by etherification, and then, the hydroxyalkylalkylcellulose is converted into acetylated cellulose ether by acetylation. Formula 2 above shows that the cellulose is converted into alkylcellulose by etherification, and then, the alkylcellulose is converted into acetylated cellulose ether by acetylation.

In Formula 1 above, $R_1$ and $R_2$ may be each independently H, $CH_3$, $CH_2CH_2OH$, or $CH_2CH(CH_3)OH$, and $R_3$ may be H or $CH_3$.

In Formula 2 above, $R_4$ and $R_5$ may be each independently H or $CH_3$, and at least one of $R_4$ and $R_5$ is $CH_3$.

The term "degree of substitution (DS)" of an alkyl group or acetyl group, as used herein, refers to an average number of hydroxyl groups substituted with alkyl group(s) or acetyl group(s) per anhydroglucose unit. Since one anhydroglucose unit includes three hydroxyl groups at the most, a theoretical maximum DS of an alkyl group or an acetyl group is 3 when substituted with a mono-functional substituent. However, a multi-functional or polymerizable substituent may react with a hydroxyl group contained in the anhydroglucose unit, and also may react with itself, so that a DS thereof is not limited to 3. In addition, the term "degree of molar substitution (MS)" of a hydroxyalkyl group, as used herein, refers to the number of moles of multi-functional or polymerizable substituent(s) per anhydroglucose unit. There is no theoretical maximum value of the MS of a hydroxyalkyl group.

The acetylated cellulose ether of the second step may be prepared by substituting hydrogen atoms of most of the hydroxyl groups that are contained in cellulose ether with hydrophobic acetyl groups. Thus, the acetylated cellulose ether is not soluble in water, but is soluble in an organic solvent.

The acetylated cellulose ether prepared in the second step may have a DS of an alkyl group of 1 to 2, a MS of a hydroxyalkyl group of 0 to 1, and a DS of an acetyl group of 1 to 2; and a turbidity of at least 40 formazin turbidity units (FTU). The term "turbidity of acetylated cellulose ether", as used herein, refers to a turbidity of a solution of acetylated cellulose ether that is prepared by dissolving the acetylated cellulose ether in dimethylformamide (DMF) and has a concentration of 5 wt %.

The above-described cellulose may be used as a starting material in the preparation of the acetylated cellulose ether of the second step, but cellulose ether having the DS and MS within the ranges described above (i.e., the DS of an alkyl group of 1 to 2 and the MS of a hydroxyalkyl group of 0 to 1) may be directly used. By the acetylation of the cellulose ether having the DS of an alkyl group and the MS of a hydroxyalkyl group within the ranges described above, acetylated cellulose ether that is not dissolved in water but is dissolved well in an organic solvent such as acetone, and

[Formula 2]

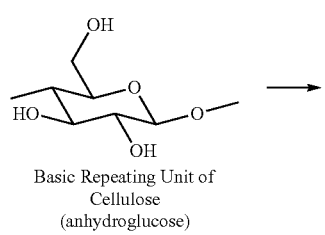

Basic Repeating Unit of
Cellulose
(anhydroglucose)

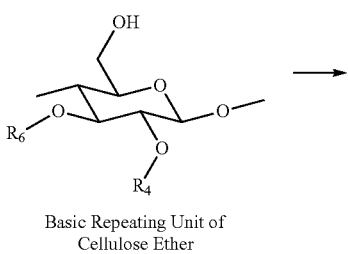

Basic Repeating Unit of
Cellulose Ether that has high molecular weight ensuring excellent mechanical strength may be obtained. A detailed description thereof will be described later.

In a third step, the acetylated cellulose ether having a turbidity of at least 40 FTU is dissolved in an organic solvent, thereby obtaining a mixture including a solution of the acetylated cellulose ether.

The organic solvent may include at least one compound selected from the group consisting of methanol, acetic acid, acetone, dimethylformamide (DMF), dimethyl sulfoxide (DMSO), and 1-methoxy-2-propanol (MP).

In a fourth step, an insoluble component that is not dissolved in the organic solvent is removed from the mixture. Theses insoluble component are also referred to as a hazy component, which acts to increase turbidity of the mixture. The insoluble component may include unreacted cellulose ether, dust, and/or salts. The removing of the insoluble component from the mixture may be carried out by at least one method of filtration and centrifugation. The filtration may be, for example, performed by using a filtering system equipped with a 300 to 800 mesh filter, whereas the centrifugation may be, for example, performed at a rotational speed of 3,000 to 7,000 rpm.

In a fifth step, the mixture from which at least some of the insoluble components are removed (i.e., filtrate in the case of filtration, or supernatant in the case of centrifugation) is added to excess water so as to precipitate the acetylated cellulose ether. Here, the term "excess water", as used herein, refers to water in which an amount of water being used is 3,000 parts by weight or greater, for example, 3,000 to 10,000 parts by weight, based on 100 parts by weight of the mixture. The precipitated acetylated cellulose ether has a turbidity of less than 40 FTU.

In a sixth step, the precipitated acetylated cellulose ether is subjected to washing and drying. The washing may be carried out by using, for example, excess water as a cleaning solution, and the drying may be carried out at a temperature of 60 to 100° C. for 30 minutes to 10 hours.

Hereinafter, the acetylated cellulose ether that is finally prepared according to the first to sixth steps will be described in more detail.

The acetylated cellulose ether may have a DS of an alkyl group of 1 to 2, a MS of a hydroxyalkyl group of 0 to 1, and a DS of an acetyl group of 1 to 2; and a turbidity of less than 40 FTU (e.g., a turbidity of 3 to 39 FTU). The acetylated cellulose ether has such a low turbidity, and accordingly may be applied to home appliances requiring transparency, and cases of home appliances requiring transparency.

In addition, a viscosity of a solution prepared by dissolving the acetylated cellulose ether in acetone (to a concentration of the acetylated cellulose ether of 2 wt %) may be in a range of 5 to 100,000 centipoise (cps) when measured by a Brookfield viscometer at 20° C. and at 20 rpm. When the viscosity of the solution is within the ranges described above, the acetylated cellulose ether has excellent mechanical strength.

The acetylated cellulose ether has a melting point of 180 to 250° C. When the melting point of the acetylated cellulose ether is within the ranges described above, the acetylated cellulose ether may be applied to a melt processing such as injection molding.

Meanwhile, an article according to an embodiment of the present invention includes the acetylated cellulose ether. The article may be, for example, a metal paste, a material for separation membrane (e.g., a membrane for water-treatment, a gas separation membrane, or a separator for battery), a packaging material, or a case of home appliance.

Mode of the Invention

Hereinafter, one or more embodiments will be described in detail with reference to the following examples. However, these examples are not intended to limit the purpose and scope of the invention.

EXAMPLES

Preparation Examples 1 to 7

Preparation of Acetylated Cellulose Ether 50 g of a cellulose ether product (manufactured by Samsung Fine Chemicals, Co., Ltd.), 900 g of acetic anhydride, and 200 g of pyridine were added to a 3 L reactor equipped with a stirrer, and the reactor content was maintained at 90° C. for 4 hours while stirring at 300 rpm to prepare acetylated cellulose ether. Then, the resulting reactor content was sprayed into a coagulating bath filled with 1,300 g of water for coagulation, and washed out the resulting coagulum with clean water 5 times, followed by being dried, thereby obtaining acetylated cellulose ether. The DS of a methyl group, the MS of a hydroxypropyl group, and the MS of a hydroxyethyl group of each of the cellulose ether products that were used in Examples 1 to 7, and the molar ratios of the acetic anhydrides that were used per anhydroglucose unit contained in each of the cellulose ether products are shown in Table 1 below.

TABLE 1

|  | Cellulose ether product | | | Acetic |
| --- | --- | --- | --- | --- |
|  | DS of methyl group | MS of hydroxypropyl group | MS of hydroxyethyl group | anhydride/ anhydroglucose unit (molar ratio) |
| Preparation Example 1 | 1.76 | 0.18 | — | 34.75 |
| Preparation Example 2 | 1.45 | 0.20 | — | 34.19 |
| Preparation Example 3 | 1.85 | — | — | 33.13 |
| Preparation Example 4 | 1.35 | — | 0.22 | 34.15 |
| Preparation Example 5 | 1.58 | — | 0.21 | 34.61 |
| Preparation Example 6 | 1.68 | — | 0.24 | 35.17 |

Examples 1 to 6

Post-Treatment of Acetylated Cellulose Ether (Filtration)

Each of the acetylated cellulose ethers of Preparation Examples 1 to 6 was dissolved in an organic solvent (e.g., DMF) to prepare a mixture including the acetylated cellulose ether solution and the insoluble component. Then, the prepared mixture was passed through a filtering system (a self-made product) equipped with various mesh size filters as shown in Table 2 below, so as to remove the insoluble component. The mixture that passed through the filtering system was then added to excess water (wherein the amount of water used herein was 3,000 parts by weight based on 100 parts by weight of the mixture) to precipitate the acetylated cellulose ether. The precipitated acetylated cellulose ether was washed out with water, followed by being dried at 80°

C. for 6 hours, thereby obtaining acetylated cellulose ether. The precipitated acetylated cellulose ether that was dried was dissolved in DMF to prepare a solution of the acetylated cellulose ether having a concentration of 5 wt %. Then, a turbidity of the solution was measured by using a turbidity measuring device (HACH DR/2000 Direct reading spectrophotometer), and the results thereof are shown in Table 2 below.

TABLE 2

|  | Turbidity (FTU) Mesh size of filter | | | |
| --- | --- | --- | --- | --- |
|  | 300 | 450 | 600 | 800 |
| Example 1 | 35 | 33 | 25 | 6 |
| Example 2 | 29 | 28 | 21 | 5 |
| Example 3 | 37 | 35 | 22 | 7 |
| Example 4 | 39 | 34 | 23 | 9 |
| Example 5 | 28 | 27 | 19 | 6 |
| Example 6 | 25 | 24 | 17 | 3 |

Referring to Table 2 above, it was found that the acetylated cellulose ethers of Examples 1 to 6 had a turbidity of 3 to 39 FTU.

Examples 7 to 12

Post-Treatment of Acetylated Cellulose Ether (Centrifugation)

Each of the acetylated cellulose ethers of Preparation Examples 1 to 6 was dissolved in an organic solvent (i.e., DMF) to prepare a mixture including the acetylated cellulose ether solution and the insoluble component. Then, the prepared mixture was added to a centrifugal separator (manufactured by Vision Science, SUPRA 22K). Then, the centrifugal separator was rotated at a rotational speed as shown in Table 3 below, so as to precipitate the insoluble component. Then, only a supernatant (i.e., a non-precipitated part) of the mixture, which was obtained by the centrifugation, was separated, and the supernatant was added to excess water (wherein the amount of water used herein was 3,000 parts by weight based on 100 parts by weight of the mixture) to precipitate the acetylated cellulose ether. The precipitated acetylated cellulose ether was washed out with water, followed by being dried at 80° C. for 6 hours, thereby obtaining acetylated cellulose ether. The precipitated acetylated cellulose ether that was dried was dissolved in DMF to prepare a solution of the acetylated cellulose ether having a concentration of 5 wt %. Then, a turbidity of the solution was measured by using a turbidity measuring device (HACH DR/2000 Direct reading spectrophotometer), and the results thereof are shown in Table 3 below.

TABLE 3

|  | Turbidity (FTU) Rotational speed (rpm) | | | |
| --- | --- | --- | --- | --- |
|  | 3,000 | 4,000 | 5,000 | 7,000 |
| Example 7 | 20 | 16 | 10 | 5 |
| Example 8 | 18 | 14 | 9 | 5 |
| Example 9 | 17 | 14 | 10 | 4 |
| Example 10 | 19 | 15 | 10 | 6 |
| Example 11 | 18 | 16 | 11 | 4 |
| Example 12 | 16 | 12 | 8 | 3 |

Referring to Table 3 above, it was found that the acetylated cellulose ethers of Examples 7 to 12 had a turbidity of 3 to 20 FTU.

Comparative Examples 1 to 6

Acetylated Cellulose Ether without Post-Treatment

Regarding each of the acetylated cellulose ethers of Preparation Examples 1 to 6 without being subjected to post-treatment, a turbidity and a DS of an acetyl group were measured and are shown in Table 4 below.

TABLE 4

|  | Comparative Example 1 | Comparative Example 2 | Comparative Example 3 | Comparative Example 4 | Comparative Example 5 | Comparative Example 6 |
| --- | --- | --- | --- | --- | --- | --- |
| Turbidity (FTU) | 53 | 50 | 60 | 63 | 52 | 48 |
| DS of acetyl group* | 1.18 | 1.29 | 1.13 | 1.35 | 1.27 | 1.24 |

*Measuring method of DS of an acetyl group: Free acetic acid generated by saponification of each of the acetylated cellulose ethers was titrated with an alkaline material to measure the DS of acetyl group of each of the acetylated cellulose ethers (ASTM D871-96).

Referring to Table 4 above, it was found that the acetylated cellulose ethers of Comparative Examples 1 to 6 (that is, Preparation Examples 1 to 6) had a turbidity of 48 to 63 FTU, and a DS of an acetyl group of 1.13 to 1.35.

In addition, the turbidities of the acetylated cellulose ethers of Examples 1 to 12 were different from those of the acetylated cellulose ethers of Comparative Examples 1 to 6, but the DSs of an acetyl group of the acetylated cellulose ethers of Examples 1 to 12 were equal to those of the acetylated cellulose ethers of Comparative Examples 1 to 6.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of preparing acetylated cellulose ether having a turbidity of less than 40 formazin turbidity units (FTU), the method comprising:

dissolving acetylated cellulose ether having a turbidity of 40 FTU or more in an organic solvent to obtain a- mixture comprising a solution of the acetylated cellulose ether; removing an insoluble component that is insoluble in the organic solvent from the mixture; and adding the mixture to water to precipitate the acetylated cellulose ether.

2. The method of claim 1, wherein the organic solvent comprises at least one compound selected from the group consisting of methanol, acetic acid, acetone, dimethylformamide, dimethyl sulfoxide, and 1-methoxy-2-propanol.

3. The method of claim 1, wherein the removing of the insoluble component from the mixture is carried out by at least one method of filtration and centrifugation.

4. The method of claim 1, further comprising washing and drying of the precipitated acetylated cellulose ether.

5. The method of claim 1, wherein the acetylated cellulose ether has a degree of substitution (DS) of an alkyl group of 1 to 2, a degree of molar substitution (MS) of a hydroxyalkyl group of 0 to 1, and a degree of substitution (DS) of an acetyl group of 1 to 2.

6. The method of claim 1, wherein the acetylated cellulose ether is formed by acetylating at least one cellulose ether selected from the group consisting of methylcellulose, hydroxypropylmethylcellulose, and hydroxyethylmethylcellulose.

7. Acetylated cellulose ether prepared according to a method of claim 1, wherein the acetylated cellulose ether has a turbidity of less than 40 formazin turbidity units (FTU).

\* \* \* \* \*